Patented Jan. 18, 1944

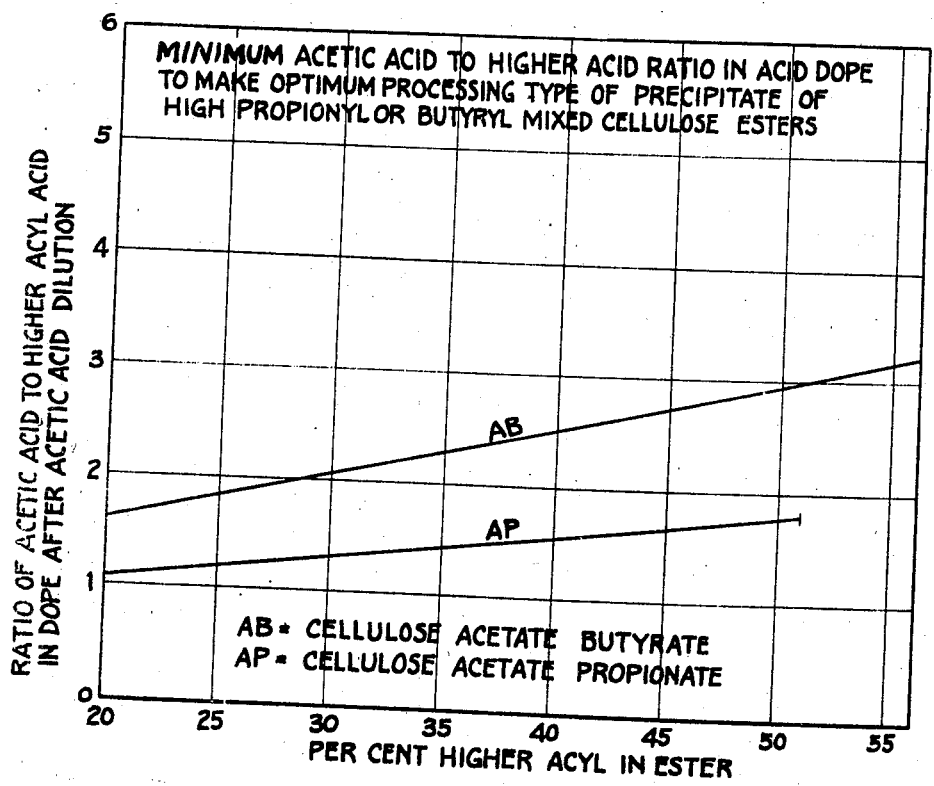

2,339,631

UNITED STATES PATENT OFFICE 2,339,631

PRECIPITATION OF A CELLULOSE ESTER HAVING A HIGH PROPIONYL OR BUTYRYL CONTENT FROM ITS REACTION MIXTURE

Charles L. Fletcher and Amos W. Crane, Kingsport, Tenn., assignors to Eastman Kodak Company, Rochester, N. Y., a corporation of New Jersey Application December 29, 1939, Serial No. 311,580

4 Claims. (Cl. 260—230)

This invention relates to the recovery of a cellulose ester having a high propionyl or butyryl content from the reaction mixture in which it is dissolved which involves assuring the presence of acetic acid in the mass in an amount sufficient to assure a soft, easily processable precipitate, at the time of precipitation.

Acetone-soluble cellulose acetates and mixed esters of cellulose having a high acetyl content are readily separated from their reaction mixtures in a physical form in which they may be readily processed such as in washing or dissolving in organic solvents. However, the precipitate ordinarily resulting from separating a cellulose ester having a high propionyl or butyryl content from its reaction mixture is hard and impervious and therefore resists subsequent processing such as washing or dissolving by organic solvents. Also this type of product is prone to retain catalyst from the esterification, which is difficult, if not impossible, to remove by washing and consequently an unstable product will ordinarily result in spite of subsequent treatment.

Methods particularly directed to stabilizing these esters have been suggested but their success has depended to a considerable extent on the degree of penetration of the ester which was possible.

One object of our invention is to provide a method of separating a cellulose ester having a high propionyl and/or butyryl content from its reaction mixture so as to result in a soft, easily penetrated product. Other objects of our invention will appear herein.

We have found that to separate a cellulose ester having a high butyryl and/or propionyl content from its spent reaction mixture essentially consisting of unsubstituted lower fatty acid, anhydride of unsubstituted fatty acid and a catalyst such as sulfuric acid and obtain a precipitate in good physical form, an amount of acetic acid should be added to the mass sufficient to make the acetic acid at least the predominant fatty acid therein prior to the precipitation and also the tetrachlorethane viscosity of the mass must be reduced below 10 secs. such as 1-8 secs. We have found as an alternative that the mass, which will be referred to as the "dope," may be diluted with a substantial part of the acetic acid required to render it the predominant fatty acid in the dope (such as 75% or more), providing the viscosity is reduced below 10 secs. thereby and the remainder of the acetic acid can then be supplied by adding dilute aqueous acetic acid containing the balance of the acetic acid required to make the acetic acid predominant, in accordance with the drawing, in sufficient dilution to cause precipitation. We have found that to obtain a precipitate having optimum physical properties acetic acid should be the predominant acid, preferably having the ratio to the propionic and butyric acid present shown in the drawing, at the point of precipitation.

We have found that to obtain a precipitate of a lower fatty acid ester of cellulose having a content of at least 20% propionyl and/or butyryl in good physical form, there should be more acetic acid than propionic and butyric acid present at the point of precipitation as illustrated by the drawing. The amount of acetic acid present at the point of precipitation may be greater than 1 part and less than 3¼ parts per part of propionic and butyric acid present. An amount of acetic acid equal to or greater than 3¼ parts per part of higher fatty acid may be present, a precipitating bath of greater concentration may be used and the same type of precipitate is obtained. The use of a ratio of acetic acid greater than the minimum shown is preferred for the sake of economy.

The accompanying drawing shows the minimum ratio of acetic acid to propionic and butyric acid which will give a precipitate having optimum physical properties for the various propionic and butyric acid esters of cellulose having a propionyl and/or butyryl content above 20%, providing the tetrachlorethane viscosity of the dope is less than 10 seconds. For instance, to precipitate cellulose acetate propionate having a propionyl content of 37½%, it may be ascertained (referring to line AP on the drawing) that the minimum ratio of acetic acid to propionic acid at the point of precipitation should be 1½:1 in order to obtain a precipitate of optimum physical properties. Therefore the amount of acetic acid concentrated or dilute to impart the ratio indicated is added and, if the viscosity is less than 10 secs., the ester is then precipitated either in water or in a weak aqueous acid containing the same, or a higher, ratio of acetic acid to propionic acid as in the diluted dope. The dilution of aqueous acetic acid used to impart the required ratio is immaterial except that it should not be so dilute as to permanently precipitate any of the ester when added to the dope.

Instead of adding all of the acetic acid which will give a ratio of 1½:1, only part of this amount may be added and if the viscosity is less than 10 secs. the precipitation may then be carried out by adding weak acetic acid containing the balance of the acetic acid required to assure this ratio. The first method, namely adding all of the acetic acid to give the desired ratio, is preferred. Among the advantages of this preferred method are better control of the precipitation and the possibility of the use for the precipitating liquid of the weak acid recovered from the washing of a preceding batch (which contains the desired ratio of acids).

If the ester to be precipitated is a cellulose acetate butyrate having a butyryl content of 30%, reference to the line AB of the drawing shows that the minimum ratio of acetic acid to butyric acid at the point of precipitation should be at least slightly more than 2:1 to give a good precipitate, providing of course the tetrachlorethane viscosity of the diluted dope is less than 10 sec. By the preferred method an amount of glacial acetic acid is added to the dope, sufficient to give this ratio and the ester is then precipitated by pouring the dope into weak acid of like ratio which is agitated.

As may be noted from the drawing which includes cellulose esters in which all of the acyl is either propionyl or butyryl, our method of precipitating is adapted also to the precipitation of cellulose esters, containing no acetyl; propionyl and/or butyryl being substantially the only fatty acid radicals present. Our method is also adapted to the precipitation of cellulose esters containing at least 20% of both propionyl and butyryl groups in which case a medium line must be used, depending on the relative proportions of propionyl and butyryl, to designate the minimum ratio of acetic acid to propionic and butyric acid which is necessary.

Our invention is adapted not only to the precipitation of the fully esterfied esters having a propionyl and butyryl content of at least 20% but also to the precipitation of the partially hydrolyzed esters of that type; the partially hydrolyzed esters being but slightly less sensitive to dilution requirements than the fully esterified esters.

It is a feature of our invention that the dope is diluted so that its tetrachlorethane viscosity is less than 10 secs. (if it is not already that) prior to the precipitating step. This dilution, if necessary, after the ratio of acetic acid to higher acid has been adjusted, may be carried out either by adding acetic acid or a mixed acid which will not decrease the acetic acid ratio in the dope. If desired the mixed acid resulting from the precipitation of a like batch previously may be used. The determination of tetrachlorethane viscosity may be carried out in accordance with the directions given on page 3, column I, lines 36–51 of Malm Patent No. 2,097,954, which issued Nov. 2, 1937.

Our precipitation method is adapted only to cellulose esters which have been prepared in a reaction mixture free of substituted fatty acids or inert solvents such as ethylene chloride, methylene chloride, chloracetic acid, ethoxyacetic acid, etc. Our precipitation method is adapted for use at temperatures between 50 and 125° F. With temperatures in the upper part of the range it is desirable to slightly lower the strength of the precipitating bath and vice versa.

The points shown in the drawing are minimum ratios of acetic to higher acid. As the esters with which our invention is concerned are more soluble in water and the esterification bath than in a mixture of acetic acid, water and the esterification bath the use of greater amounts of acetic acid allow the use of precipitation baths of higher concentration. Therefore the use of acetic acid in an amount greater than the minimum ratios of the drawing is preferred.

The following examples illustrate the precipitation of cellulose esters in accordance with our invention:

*Example I*

A cellulose acetate butyrate was prepared by esterifying 500 pounds of refined cotton linters with an esterification mixture containing 500 pounds of acetic acid, 500 pounds of butyric acid and 2000 pounds of butyric anhydride together with a sulfuric acid catalyst. After the esterification was completed, 1000 pounds of 50% acetic acid was added and the ester was hydrolyzed for a short time. The mass consisted of 1000 pounds of cellulose acetate butyrate containing 37% combined butyryl and 13.5% of combined acetyl, 2271 pounds of butyric acid, 812 pounds of acetic acid and 417 pounds of water together with a small amount of sulfuric acid. The mass had a tetrachlorethane viscosity of 250 seconds. It may be seen that the ratio of acetic acid to butyric acid in the mass is .358. According to the drawing, a dope containing a cellulose ester, of 37.5% butyryl, should have an acetic acid ratio of at least 2.4. The amount of 100% acetic acid which is necessary to impart a ratio of acetic acid to butyric acid of 2.4 is 4638 pounds. This amount of acetic acid was added to the dope and the mass then had a tetrachlorethane viscosity of 4 seconds. There it was not necessary to add any further acid to lower the tetrachlorethane viscosity. The ester was precipitated from the dope by slowly pouring into 10% mixed acid resulting from the counter-current washing of the previous batch, giving a fine, porous flake, precipitate admirably adapted to processing to a product of good stability properties. The strength of the resultant dope and precipitant acid was 38% as acetic acid. It is understood, of course, that the precipitating liquid was agitated during the precipitation.

*Example II*

A dope containing 925 pounds of a cellulose ester containing 32% propionyl and 15% acetyl (which ester had been hydrolyzed one-fourth of the way to the diester), 612 pounds of acetic acid, 2948 pounds of propionic acid and 7500 cc. of sulfuric acid, which dope had a tetrachlorethane viscosity of 6 seconds, was diluted with 5400 pounds of glacial acetic acid. The mass was precipitated by adding it to agitated water in an amount to give 42% acid, figured as acetic acid. A soft, porous precipitate, which was readily susceptible to further processing, was obtained. The ratio of acetic acid to propionic acid of the diluted dope before precipitation was 2.02:1 or 67% acetic acid and 33% propionic acid.

*Example III*

A similar ester to that of Example II was made and hydrolyzed to the same point except that the first-stage viscosity was 90 seconds. The dope was diluted with 6400 pounds of glacial acetic acid and water was then poured in with adequate stirring, in an amount sufficient to give an acid concentration of 44%, figured as acetic. The ratio of acetic acid to propionic acid, after the addition of the glacial acetic acid, was 2.48 to one or, in other words, the acid content was 70.5% acetic and 29.5% propionic acids. A porous powder was obtained having a propionyl content of 32% and an acetyl content of 15%.

Example IV

A cellulose acetate butyrate was prepared and hydrolyzed to one-third of the way to the diester. The tetrachlorethane viscosity of the dope, whose composition is as follows, was 280 seconds:

1000 pounds of cellulose ester, containing 36% butyryl and 14% acetyl, 811 pounds of acetic acid, 2284 pounds of butyric acid, 500 pounds of water, 3000 cc. of sulfuric acid. This dope was diluted with 6000 pounds of glacial acetic acid and then precipitated by pouring into mixed acids of 10% strength which were obtained from the counter-current washing of a previous batch of cellulose acetate butyrate. An amount of acid was used so that the precipitation bath had a strength of 46%, figured as acetic acid. The ratio of acetic acid to butyric acid in the diluted dope prior to precipitation was 2.98 to one. A flake precipitate of good physical form was obtained.

In view of the excellent physical form of the cellulose esters obtained in accordance with our invention, the product is easily washed, preferably counter-currently. It also lends itself with optimum efficiency to such subsequent processing operations as final washing, bleaching, boiling and stabilizing by the various heterogeneous methods. Also, because of the good physical form of the product, it is readily susceptible to solution by organic solvents. Therefore, the products obtained, in accordance with our invention, are useful for preparing sheeting, synthetic yarn and the like because of the ease with which they may be dissolved. They are also suited for use not only in those capacities but also in molding compositions, baking lacquers or for use where treatment with an elevated temperature is involved.

The precipitates obtained in accordance with our process are in a loose easily penetrable form. However, their external appearance depends somewhat on the manner of precipitating. If the precipitating liquid is slowly added to the dope at an elevated temperature (for instance 100–125° F.) accompanied by high speed agitation the precipitate is obtained in the form of a fine powder. If the precipitating liquid is added more rapidly at a lower temperature (such as 50–80° F.) accompanied by low speed agitation the precipitate is in a coarse form which in some cases may be described as semi-flake. If the dope is added to the precipitating liquid the precipitate is obtained in flake form, the size of the flakes depending on the speed of agitation, the size of the stream of dope which passes into the precipitating liquid and the temperature employed.

The only criterion of the precipitating bath is that its fatty acid concentration remains less than that which will dissolve the cellulose ester and that it will not upset the ratio of acetic acid to propionic and/or butyric acid which is being maintained in accordance with our invention. For the sake of economy it is preferred that the strength of the precipitation bath be as high as possible without detrimentally affecting the separation of the cellulose ester from the dope. However water itself may be used for the precipitating liquid if desired.

Because of the loose, easily penetrable form of the precipitates obtained in accordance with our invention, they are more easily stabilized than are high propionyl or butyryl esters of cellulose precipitated in some other manner. For instance after a stabilizing treatment, a high butyryl cellulose acetate butyrate (approx. 38% butyryl) which had been precipitated in accordance with our invention exhibited only a very slight tan upon heating at 160° C. for 8 hours. A like ester which had been precipitated without adjusting the ratio of acetic to butyric acid in the dope and which had been given the same stabilizing treatment became a black char upon heating at 160° C. for 8 hours, showing the latter ester to be incompletely stabilized.

The adjusting of the acetic acid-propionic (or butyric) acid ratio in the dope may be accomplished using acetic acid either concentrated or dilute. The strength of the acetic acid used may range from 100% down to nearly water. The diluting liquid should have enough acetic acid so that it will give the required acetic acid-propionic (or butyric) acid ratio in the dope without precipitating the ester to the extent that the precipitated ester will not go back in solution therein.

The term "dope" as used herein applies to the solution of the cellulose ester in the spent esterification mixture either with or without added materials before this solution is mixed with the precipitating liquid.

We claim:

1. In a process of preparing a cellulose ester having a content of fatty acid groups of 3–4 carbon atoms of at least 20%, the acyl of the ester consisting essentially of saturated, unsubstituted fatty acid groups of 2–4 carbon atoms, in which process the cellulose ester formed is in solution in a spent cellulose esterification bath substantially free of substituted fatty acid compounds and inert solvents the major portion of the acyl of said bath being saturated fatty acid groups of 3–4 carbon atoms, the steps which comprise adding acetic acid to the bath in an amount sufficient to assure a tetrachlorethane viscosity in the mass of less than 10 seconds and a ratio of acetic acid to fatty acid of 3–4 carbon atoms in the mass of at least that shown and described in the specification and precipitating with a precipitating bath having a large water content so that a loose, readily penetrable product is obtained.

2. In a process of preparing a cellulose acetate propionate having a propionyl content of at least 20%, the acyl of the ester consisting essentially of saturated unsubstituted fatty acid groups of 2–4 carbon atoms, in which process the cellulose ester formed is in solution in a spent cellulose esterification bath substantially free of substituted fatty acid compounds and inert solvents the major portion of the acyl of said bath being propionyl, the steps which comprise adding acetic acid to the bath in an amount sufficient to assure a tetrachlorethane viscosity in the mass of less than 10 seconds and a ratio of acetic acid to fatty acid of 3–4 carbon atoms in the mass of at least that shown and described in the specification and precipitating with a precipitating bath having a large water content so that a loose, readily penetrable product is obtained.

3. In a process of preparing a cellulose acetate butyrate having a butyryl content of at least 20%, the acyl of the ester consisting essentially of saturated unsubstituted fatty acid groups of 2–4 carbon atoms, in which process the cellulose ester formed is in solution in a spent cellulose esterification bath substantially free of substituted fatty acid compounds and inert solvents the major portion of the acyl of said bath being butyryl, the steps which comprise adding acetic acid to the bath in an amount sufficient to assure a tetrachlorethane viscosity in the mass of less than 10 seconds and a ratio of acetic acid to fatty acid of 3-4 carbon atoms in the mass of at least that shown and described in the specification and precipitating with a precipitating bath having a large water content so that a loose, readily penetrable product is obtained.

4. In a process of preparing a cellulose acetate butyrate having a butyryl content of approximately 37 per cent, the remainder of the acyl being acetyl in which process the cellulose ester formed is in solution in a spent cellulose esterification bath substantially free of substituted fatty acid compounds and inert solvents, the major portion of the acyl of said bath being butyryl, the steps which comprise adding acetic acid to the bath in an amount sufficient to assure a tetrachlorethane viscosity in the mass of less than 10 seconds and a ratio of acetic acid to butyric acid in the mass of at least 2.4 to 1, and then precipitating the cellulose ester with a precipitating bath having a large water content so that a loose readily penetrable product is obtained.

CHARLES L. FLETCHER.
AMOS W. CRANE.